Oct. 1, 1968   W. H. FENGLER   3,404,281
ULTRA-SENSITIVE PHOTOELECTRIC CONTOUR PROBING DEVICE
Filed March 2, 1965   5 Sheets-Sheet 1
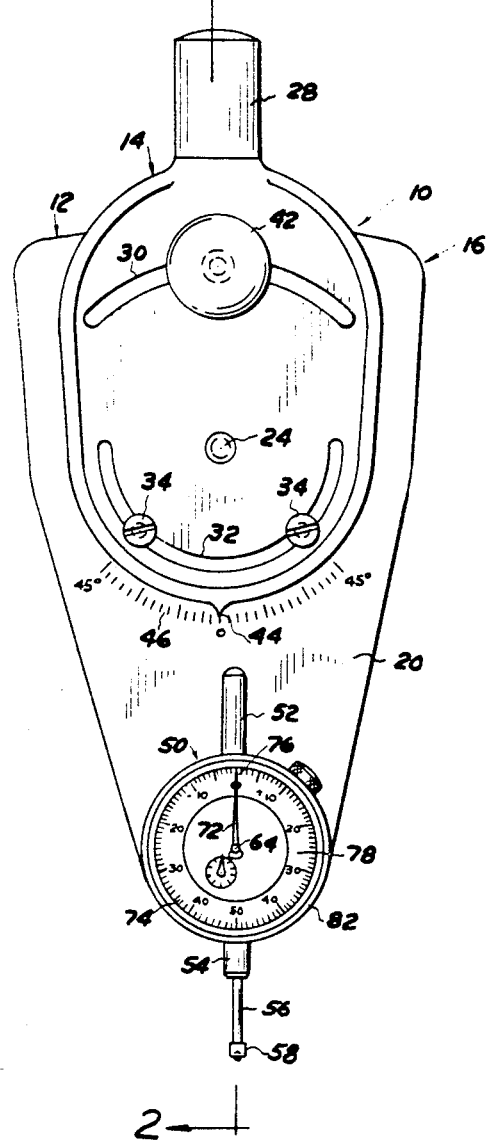
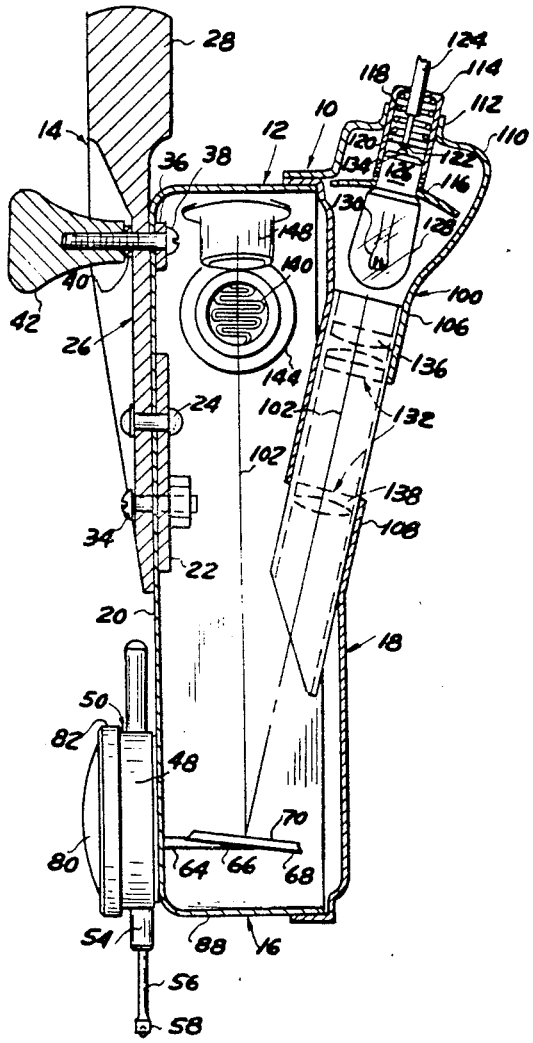
INVENTOR
WERNER H. FENGLER.
BY Barthel & Bugbee
ATTORNEYS Oct. 1, 1968  W. H. FENGLER  3,404,281

ULTRA-SENSITIVE PHOTOELECTRIC CONTOUR PROBING DEVICE

Filed March 2, 1965  5 Sheets-Sheet 2

INVENTOR.
WERNER H. FENGLER,
BY Barthel & Bugbee
ATTORNEYS

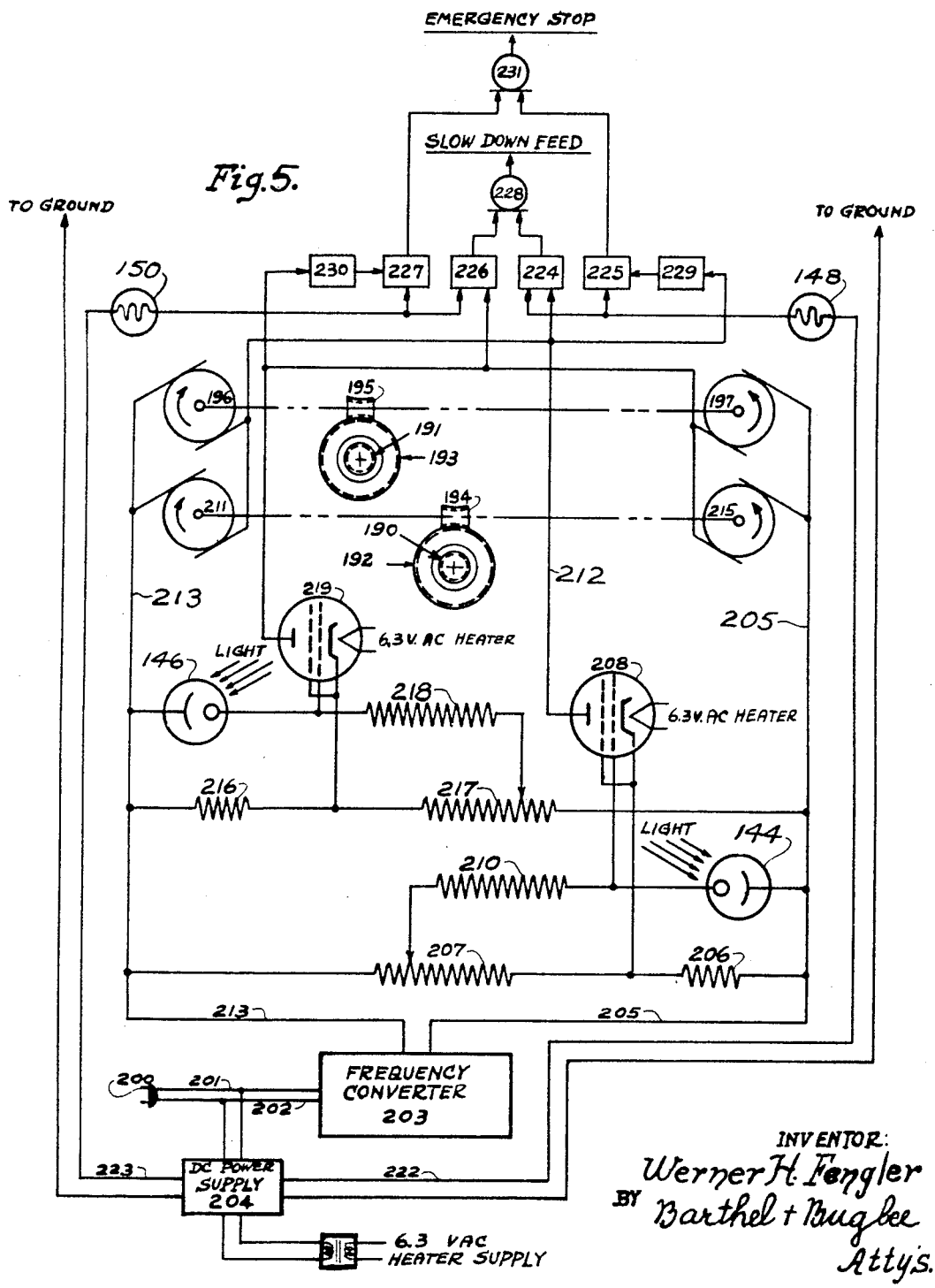

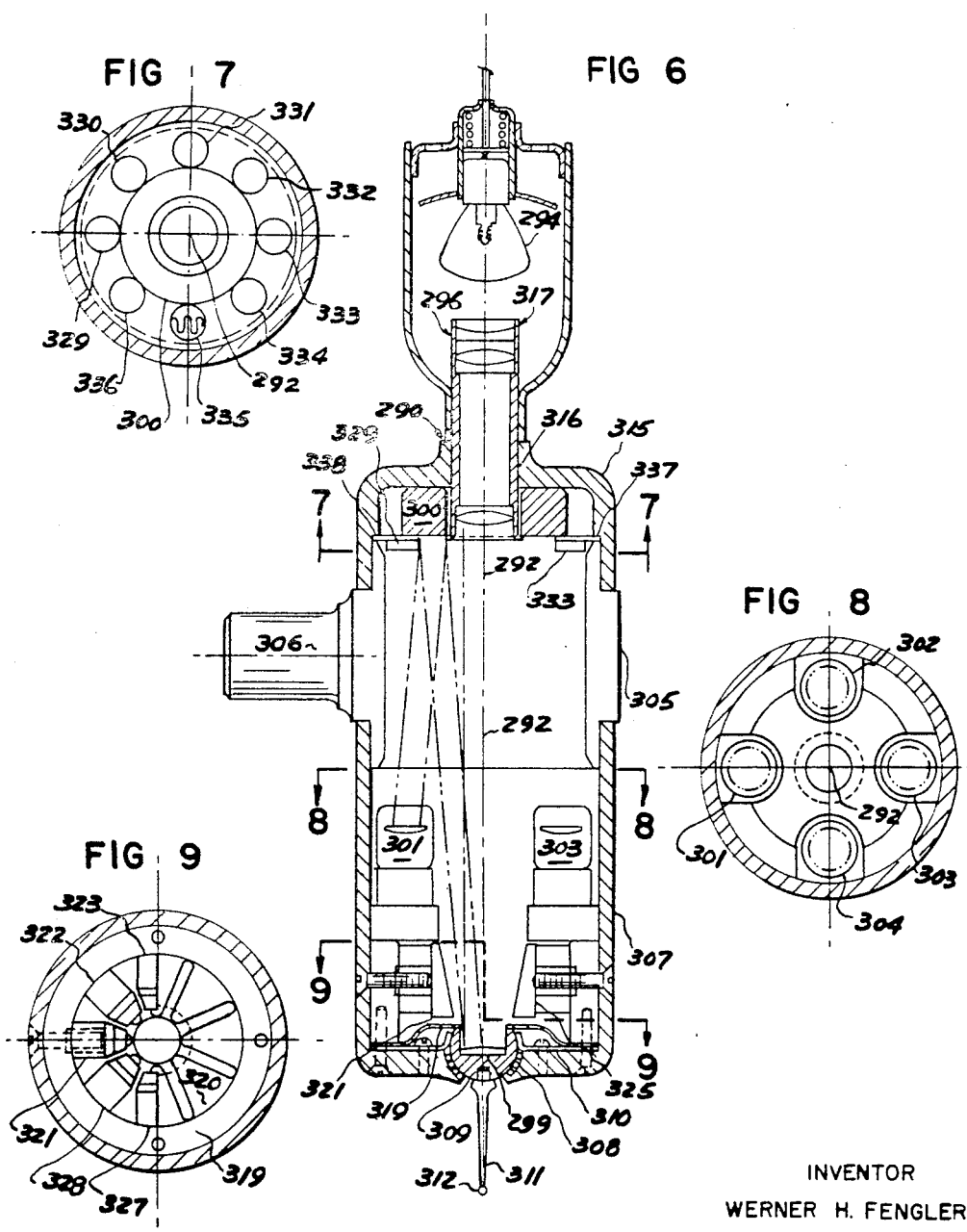

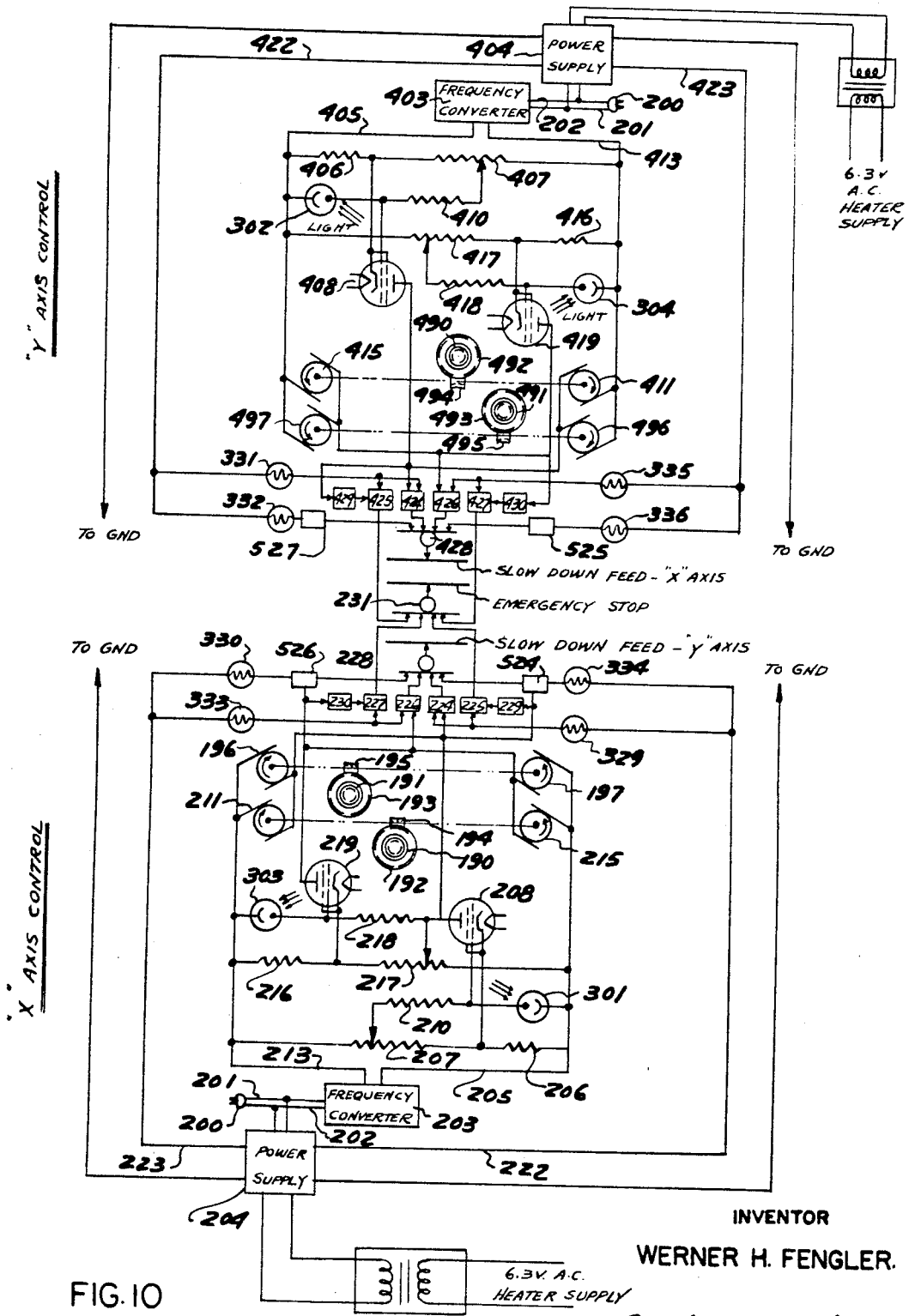

United States Patent Office 3,404,281
Patented Oct. 1, 1968

3,404,281
ULTRA-SENSITIVE PHOTOELECTRIC CONTOUR PROBING DEVICE
Werner H. Fengler, 23651 Fordson Drive, Dearborn, Mich. 48124
Filed Mar. 8, 1965, Ser. No. 437,810
22 Claims. (Cl. 250—202)

ABSTRACT OF THE DISCLOSURE

The device is an ultrasensitive probe for use with contour-reproducing apparatus. The probe uses a balanced light path between a plurality of photoelectric cells and a light source. A mirror attached to the probe reflects the light from the light source. At the selected or null position of the probe all light cells receive equal amounts of light. Any deviation from the null position produces a signal in a servo system to bring the probe to its null position. The servo system may also produce signals which may control other desired apparatus such as a cutting tool, drafting equipment etc.

---

Hitherto, in my United States Patent No. 3,032,881 issued May 8, 1962 for Contour-Reproducing Apparatus, I have disclosed and claimed apparatus which automatically follows the lines of master drawings and transforms their two-dimensional representations of an object into three-dimensional motions of a cutting tool which correspondingly grooves a model blank at spaced locations horizontally or spaced levels vertically. The material lying between the bottoms of adjacent grooves is then cut away or otherwise removed, leaving a model corresponding in configuration very closely to the model called for by the drawings. Furthermore, as disclosed in the same prior patent of mine, the apparatus thereof may be operated reversely for checking the accuracy of configuration of the model relatively to the drawing in the selected planes or levels indicated by the drawings.

The present ultra-sensitive photoelectric contour probing device, when used with the apparatus of my said Patent No. 3,032,881, precisely follows the three-dimensional configuration and contours of an object, such as a styling clay model of an automobile body, and provides a digital input into a computer, or automatically draws section lines in all planes and views, or automatically and rapidly cuts aluminum templates in a slave mill, or indicates instantly any error in or deviation from the desired configuration for the object while following the contours thereof.

The probe thereof exerts such a slight pressure upon the model as to leave its configuration unmarred even when it is made of soft clay. The moving parts are reduced to a minimum and the accuracy is thus increased by providing an optical arrangement which eliminates much mechanism which would otherwise be subject to backlash or other sources of mechanical error, and which, when used in conjunction with a machine speed control circuit including, for example, a Wheatstone bridge circuit or its equivalent, controls the feeding mechanism which moves the probing device over the model or other object being probed and reduces or increases the feeding speed automatically according to the varying motion of the probe of the probing device which makes actual contact with the object.

This contour probing device when used with suitable stepping motors or other transducers, in conjunction with the equipment shown in my U.S. Patent No. 3,032,881 of May 8, 1962, instantaneously, continuously and automatically generates coordinates in digital or binary form suitable for direct input into a computer, thereby eliminating the errors of the human operator when measuring coordinates in different views by means of presently available equipment.

When used with the proper logic modules, it guards against excessive discrepancies by shutting down the apparatus before the probe can mar or otherwise injure the surface of the object being probed, such as, for example, a soft clay model.

In the accompanying drawings:

FIGURE 1 is a front elevation of an ultrasensitive photoelectric contour probing device, according to one form of the invention;

FIGURE 2 is a central vertical section taken along the line 2—2 in FIGURE 1;

FIGURE 5 is a wiring diagram of a machine control circuit employing the contour probing device of the present invention in conjunction with thyratron tubes and logic modules to control accurately each cycle of response;

FIGURE 6 is a central vertical section through a modified universally-movable ultrasensitive photoelectric contour probing device, according to another form of the invention;

FIGURE 7 is a horizontal section taken along the line 7—7 in FIGURE 6, looking upward;

FIGURE 8 is a horizontal section taken along the line 8—8 in FIGURE 6, looking downward;

FIGURE 9 is a horizontal section taken along the zig-zag line 9—9 in FIGURE 6, also looking downward; and FIGURE 10 is a wiring diagram of a modified machine control circuit employing the modified contour probing device of FIGURES 6 to 9 inclusive.

Figure 3:
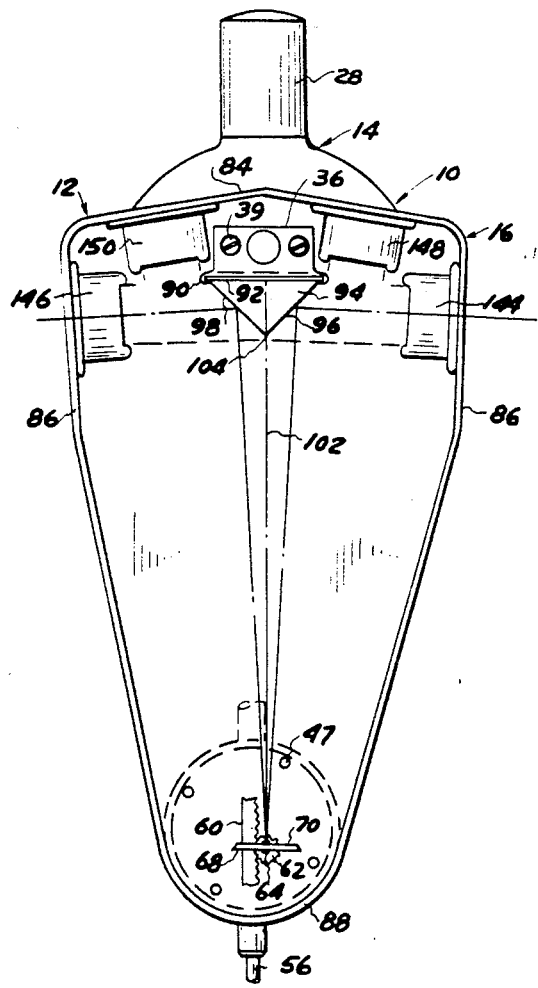
FIGURE 3 is a rear elevation with the rear cover and collimated light source removed.

Referring to the drawings in detail, FIGURES 1, 2 and 3 show an ultrasensitive photoelectric contour probing device, generally designated 10, according to one form of the invention consisting generally of a probing unit 12 and a mounting unit 14. The probing unit 12 is mounted in a casing 16 of roughly triangular shape (FIGURE 3) having a similarly-shaped flanged cover 18 (FIGURE 2) closing the open rearward end of the casing 16. The casing 16 and its cover 18 provide a supporting structure for the components of the device. The casing 16 is provided with a roughly triangular front wall 20 which is drilled and reinforced by an internal plate 22 (FIGURE 2) to receive a pivot pin 24 upon which is pivotally supported a mounting member of plate, generally designed 26.

The mounting plate 26 is of approximately elongated oval shape. At its upper end, the mounting plate 26 is provided with an upstanding cylindrical stem or machine attachment portion 28, and near its upper and lower ends is provided with upper and lower arcuate slots 30 and 32 respectively centered at the center of the pivot pin 24 but located at slightly different radii therefrom. The reinforcing plate 22 and the front wall 20 of the casing 12 are drilled at laterally-spaced locations in line with the lower arcuate slot 32 to receive a pair of bolts 34. The upper portions of the front wall 20 and mounting plate 26 are similarly drilled together with an angle bracket or prism mount 36 to receive a locking screw 38 (FIGURE 2), the threaded shank of which projects forwardly from the mounting plate 26 and receives a washer 40 and thumb nut 42. The prism mount 36 is secured to the inner side of the front wall 20 by bolts or screws 39 (FIGURE 3).

The lower end of the mounting plate 26 is provided with a pointer 44 which registers with a graduated degree scale 46 concentric with the pivot pin 24. Assuming the stem 28 to be mounted in a suitable chuck or socket in the machine, by loosening the bolts 34 and the thumb nut 42, the probing unit 12 can be swung or tilted through any desired angle up to 45 degrees relatively to the mounting unit 14 in order to present the probing unit 12 at the most desirable angle to the model or other three-dimensional object being probed. By tightening the bolts 34 and thumb nut 42, the operator locks the probing unit 12 in its adjusted position. Normally, the adjustment will be so made that the axis of the probe in its average or median position, for the particular area of the object being traced out, will be disposed approximately radial to the surface of that area at the center thereof. When the contour has changed considerably, readjustment should be made.

Secured by suitable fasteners 47 to the lower portion of the front wall 20 of the casing 16 is the circular case 48 of a dial indicator, generally designated 50. The case 48 is provided with an upstanding upper mounting stem 52 which is not made use of in the present invention, and diametrically opposite it a depending hollow lower stem 54. The dial indicator case 48 is so mounted that the axis of the hollow lower stem 54 is vertical. Within the hollow lower stem 54 is reciprocably mounted a work-contacting contour probe or feeler 56 carrying on its lower end a ball contact tip 58 which engages the model or other object being traced or probed. Operatively connected to the upper end of the probe 56 is a toothed rack 60 which is guided for vertical reciprocation within the dial indicator case 48. The rack 60 and its accompanying parts are shown diagrammatically in FIGURE 3 for simplicity of disclosure.

Meshing with the teeth of the rack 60 is a pinion 62 on the forward portion of a horizontal rotary reflector shaft 64. The upper side of the shaft 64 in the zero position of the dial indicator 50 is provided with a downwardly and rearwardly inclined flat surface 66. Mounted on the surface 66 is a movable reflector 68, such as a front-silvered or front-aluminized mirror, the reflecting front surface 70 of which is also tilted downwardly and rearwardly at a slight angle to the shaft 64. Secured to the forward end of the shaft 64 is the hub of a needle or pointer 72 (FIGURE 1) which registers with the graduations on a circular graduated scale 74 to indicate the displacement of the probe tip 58 relatively to the zero graduation 76 of the graduated scale 72. The scale 74 is so graduated as to indicate upward or downward displacement on the probe tip 58 in opposite directions relatively to the zero mark 76. The dial indicator case 48 and the graduated scale 74 thereof on its dial 78 are covered by a transparent crystal 80 mounted in a bezel 82. By the foregoing construction, the probe or feeler 56 may engage the probed or traced surface of the model with a contact pressure of only 10 to 15 grams so that even if the model is of soft clay, the tip 58 of the probe 56 does not mar it.

The casing 16 of the probing unit 12 is provided with a shallowly-V-shaped top wall 84 (FIGURE 3) and downwardly-inclined side walls 86 tapering toward one another to an approximately semicylindrical bottom wall 88. Secured to and depending from the lower portion of the angle bracket or stationary reflector mount 36 and held therein by the reversely-bent opposite ends 90 thereof is the slant face 92 of a stationary beam divider or stationary right-angled reflector 94, the right-angled faces 96 and 98 of which are silvered or aluminized. Tiltably mounted on the rear cover 18 of the casing 16 is an illuminated collimator, generally designated 100 (FIGURE 2). The angle bracket 36, the collimator 100 and the movable reflector 68 are so mounted upon their respective supports (FIGURES 2 and 3) that the principal ray 102 of the parallel-ray beam or bundle emitted by the collimator 100 proceeds in a direction intersecting the center of the rotary shaft 64 and, after reflection from the front surface 70 of the movable reflector 68 in its zero position 76 on the scale 64, intersects the apex 104 of the stationary reflector 94 in a direction perpendicular to the slant face 92 thereof.

The collimator 100 consists of a housing 106, the lower portion 108 of which is tubular and the upper portion 110 enlarged and bulbous and terminating in a tubular flange 112. Mounted in the flange 112 is a cup-shaped electric lamp socket 114 terminating in a spherical reflector 116. Resiliently mounted by a compression spring 118 in the lamp socket 114 is the supporting disc 120 of insulating material carrying a center contact 122 connected to an insulated wire 124. The lamp socket 114 receives the base 126 of an electric light bulb 128, the filament 130 of which is centered upon the optical axis of a collimating lens system, generally designated 132. The axis is also the geometrical axis of the tubular portion 108 of the collimator housing 106 and coincides with the principal ray 102 therefrom. The center contact 134 of the base 126 of the light bulb 128 engages the contact 122 while its sides engage the cup-shaped socket 114 which is connected to another insulated conductor (not shown) for connection to a source of electricity for energizing the filament 130.

Mounted in the tubular portion 108 of the housing 106 are the condensing lenses 136 and objective lens 138 of the collimating lens system 134 of the collimator 100. The prism 94 is, therefore, a beam divider which, in the zero or neutral position of the probe 56 or feeler and movable mirror 68 so divides the light reflected from the mirror 68 as to reflect equal portions of the beam in opposite directions onto the photo-sensitive elements 140 of opposite lower photoelectric control cells 144 and 146 respectively mounted on the inner sides of the side walls 56 (FIGURE 3). Mounted on the under side of the top wall 84 and depending therefrom on opposite sides of the reflecting prism 94 in the space between the latter and the lower photoelectric limit cells 144 and 146 are similar opposite upper photoelectric cells 148 and 150 respectively.

Figure 4:
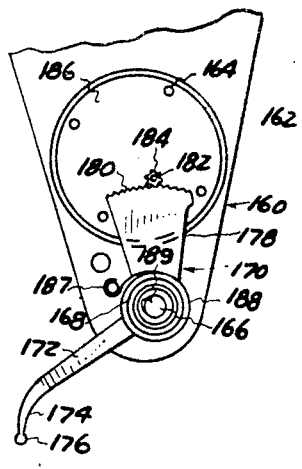
FIGURE 4 is a fragmentary front elevation, with the front cover removed, of a modified contour probing device employing a trailing-arm probe.

In probing or tracing out the contours of models or other three-dimensional workpieces without excessviely inclined surfaces, the straight probe or feeler 56 is found satisfactory, particularly when used in conjunction with the tilting adjustment of the probing unit 12 relatively to the mounting unit 14 by means of the pivotal connection 24 and locking fasteners 34 and 42 in their respective arcuate slots 32 and 30 (FIGURE 1). Where, however, the straight probe or feeler 56 is incapable of reaching the workpiece surface at a suitable angle, the trailing arm probing unit, generally designated 160, shown in FIGURE 4 is conveniently employed. The probing unit 160 includes a mounting plate 162 which may either constitute the front wall 20 of the casing 12 or be a separate plate fastened thereto, as in the case of the dial indicator 50 in FIGURE 1, by fasteners 164.

Rotatably mounted on and journaled in the mounting plate 162 is a rotary shaft 166 to which is keyed or otherwise drivingly secured the hub 168 of an operating member, generally designated 170. The operating member is in the form of a bent lever having a feeler or probe 172 extending downwardly and obliquely as an arm thereof and terminating in an arcuate end portion 174 with a ball tip 176. Extending upwardly from the hub 168 at an obtuse angle to the feeler arm 172 is a quadrant gear arm 178 having an arcuate toothed portion 180 centered on the axis of the rotary shaft 166 and thus serving as an arcuate rack. Meshing with the arcuate toothed rack 180 is a pinion 182 mounted on a rotary reflector shaft 184 journaled in the bearing plate or disc 186 which is also secured by the fasteners 164 to the plate 162. The rotary reflector shaft 184 is similar to the rotary reflector shaft 64 and is similarly provided with a movable reflector 70 (FIGURE 2). The remainder of the construction of the trailing arm probing unit 160 is the same as that shown in FIGURES 1, 2 and 3 and hence requires no additional description.

Mounted on the plate 162 is an anchor screw 187 to which is anchored one end of a light torsion spring or hair spring 188, the opposite end of which is set into and thereby secured to the rotary operating shaft 166, which is slotted at 189 for that purpose. The spring 188 normally tends to rotate the shaft 166 and swing the feeler 172 to bring its tip 176 into contact with the surface of the model or other object being probed.

The photoelectric contour probing device 10, equipped with either the probing unit 12 or the trailing-arm probing unit 160 is connected in the machine speed control circuit shown in FIGURE 5. This in turn is connected to the feeding motors in speed-controlling relationship therewith in a manner similar to that described in my above-identified prior Patent No. 3,032,881 of May 8, 1962 and includes a master-and-slave drive. When the straight probe or feeler 56 is employed, only the weight of it and the free-floating rack 60 rests on the clay or other material of the model. If additional pressure is desired, weights (not shown) are threaded on and thus secured to the top of the rack 60, which is provided with threads (not shown) for this purpose. If, however, the probing device 10 is used with the probing unit 12 in a horizontal position, a hair spring or other light spring similar in action to the hair spring 190 of FIGURE 4 is employed to maintain the stright feeler or probe 56 in contact with the surface of the model or other object being probed or traced out.

OPERATION

In the operation of the ultra-sensitive photoelectric contour probing device 10 of FIGURES 1, 2 and 3, the filament 130 of the light bulb 128 is illuminated by connecting the socket 114 and conductor 124 to a suitable source of current electricity. The beam or bundle of rays emerging parallel from the collimating system 132 of the collimator 100 after reflection from the reflecting surface 70 of the movable mirror 68, with the latter in its zero or neutral position shown in FIGURE 1 with the needle 72 coincident with the zero mark 76, is split into two equal halves by the stationary reflector or beam divider 94. One half of the beam having the principal ray 102 is reflected by the face 96 onto the photosensitive element 140 of the lower photoelectric tube 144, whereas the other half is similarly reflected by the face 98 onto the photosensitive element 140 of the lower photoelectric tube 146.

If the probed surface does not cause displacement of the movable mirror 68 from its zero position the outputs from these tubes balance each other in a Wheatstone bridge circuit or other suitable circuit, such as that shown in FIGURE 5 and described below, the resultant output is zero and no error signal is emitted. If, however, there is an error in the configuration of the surface of the model or other object being probed, the probe or feeler 56 moves upward or downward, rotating the shaft 64 through the rack 60 and pinion 62 (FIGURE 3) and tilting the reflecting face 70 of the reflector 68 in one direction or the other. This action causes one of the photoelectric tubes 144 or 146 to receive a greater portion of the light beam than the other, upsetting the balance in the Wheatstone bridge circuit, and causing emission therefrom of an error signal indicating the need for positive or negative deflection.

If, however, the contour of the model changes at a rate faster than the feeding mechanism of the machine which moves the probing device 10 can handle it, the consequent excessive motion of the feeler 56 and excessive tilting of the reflector 68 causes a part of the light beam to be reflected from the reflector surface 70 past the stationary reflector 94 directly onto either the upper photoelectric cell 148 or the upper photoelectric cell 150. The outputs of the upper photoelectric cells 148 and 150 act upon the control circuit to automatically reduce the rate of feed of the driving mechanism of the machine carrying the probing device 10 until the slave drive can catch up. If the tilt of the movable mirror 68 is so excessive as a result of very excessive travel of the feeler or probe 56, so that the lower photoelectric cell 144 or 146 does not receive any light at all, and the entire beam reaches either the upper photoelectric cell 148 or 150, the control circuit operates automatically to halt the feeding mechanism until the operator manually reduces the feeding rate sufficiently to accommodate the steep rise of surface contour or configuration of the model or other object being traced. The operator can assist this action by swinging the probing unit 12 relatively to the mounting unit 14 in the manner described above in connection with their construction to a maximum of 45 degrees to either side of the center line or axis of the stem 28. Should the straight probe or feeler 56 be incapable of reaching the probe surface at a proper angle, the operator employs the modified probing device 160 with the trailing arm feeler 172.

The probe or feeler 56 normally operates in or close to the neutral position indicated by the needle 72 of the dial indicator 50 coinciding with or being close to the zero mark 76 of the graduated scale 74 (FIGURE 1). When the operator at the start of operations is moving the probing device 10 manually toward the surface of the model or other object to be probed, he watches the dial indicator needle 72 until it indicates that the needle 72 is at the zero mark 76 in the neutral or zero position of the probe or feeler 56. At this instant, the operator shifts the machine into the automatic feed position wherein the carriage moves the probing device 10 automatically relatively to the model as, for example, by depressing the conventional starter button in the control circuit. To provide for an accidental overtravel of either the straight probe or feeler 56 of FIGURES 1, 2 and 3 or the trailing arm probe or feeler 172 of FIGURE 4, the lengths of the straight rack 60 and arcuate rack 180 respectively are made sufficient to provide for an accidental overtravel or plus or minus one-half inch before the probe 56 or 172 bottoms.

One application of the above-described probing device 10 when sensing the contour of a model, as shown in FIGURE 5, is to control simultaneously its own motion and that of an automated drafting board or a slave mill, as disclosed and claimed respectively in my above-mentioned U.S. Patent No. 3,032,881 issued May 8, 1962 and in my copending patent application Ser. No. 340,983 filed Jan. 29, 1964. The machine which holds and moves the probe has been described in detail in my said U.S. Patent No. 3,032,881 of May 8, 1962.

The carriage holding the probe 56 and the drafting board or the slave mill, as the case may be, have stationary ballbearing screws 190 and 191 respectively with a lead of 0.200 inch, i.e. 5 threads to the inch, so that five turns of the rotating nuts 192 and 193 will move the probe 56 and the stylus of the drafting board exactly one inch. Each nut 192 is rotated by a worm 194 with a speed reduction of exactly 1 to 20. The worm 194 is driven in one direction by a stepping motor 211, the rotor of which will turn exactly 18 degrees when energized by one positive direct current impulse. Accordingly, 2000 direct current impulses will rotate the nuts 192 controlling the travel of the carriages five times and move the probe 56 and registering stylus respectively on one coordinate, exactly the distance of one inch so that each impulse represents 0.0005 inch of travel. The stepping motor 211, when energized, turns the worm 194 of the worm drive in a clockwise rotation, and a second stepping motor 215 connected to the other end of the same worm 194, when energized, will turn the worm 194 counterclockwise.

With the probe 56 electrically connected to these stepping motors in the above-described manner shown in the wiring diagram (FIGURE 5), all movements of the probe 56 and the recording stylus of the automated drafting board or the milling cutter, of the slave mill, as the case may be, are held in synchronization, and in an analog manner the distance both carriages are travelling are measured and recorded.

In the wiring diagram of FIGURE 5, the number 200 designates the input connections of the standard supply of 115 volts alternating current, of 60 cycles per second frequency. Lines 201 and 202 respectively furnish power to a variable frequency converter 203 and to a filtered direct current and alternating current heater power supply 204, which has the proper output voltage for the selected logic modules and tubes, which are described later. The manual selection of the frequency used will control the speed of travel in "true time." For instance, 60 cycles per second will move the carriages 0.030 inch per second in one direciton, which equals a speed of 1.8 inches per minute, whereas 400 cycles per second will move the carriages 12 inches per minute.

The output of the frequency converter 203 is connected through line 205 to a fixed resistor 206 of 1000 ohms resistance. The other end of this resistor 206 is connected to a large variable resistor 207 of 5000 ohms resistance and also to the cathode of a thyratron tube 208 of the type commercially designated General Electric No. 2050–A. The second grid of this tube 208 is connected to its cathode. Heating voltage for this tube is provided as one output of the above-mentioned direct current power and alternating current heater supply 204 entitled "6.3 Vac Heater Supply" in FIGURE 5. Connecting lines are omitted for the sake of the clarity of this diagram.

The light beam 102 in FIGURE 3, after striking the reflector 96 strikes the photoelectric tube 144 which is of the type commercially designated Radio Corporation of America No. 934. The cathode of the photoelectric cell 144 is directly connected to the line 205 coming from the frequency converter 203, whereas its anode is connected to the first control grid of the thyratron tube 208.

The output of this thus-illuminated photoelectric tube 144 will so alter the voltage of the control grid of the thyratron tube 208 that it will not conduct as long as the light beam is fully resting on the cathode of the photoelectric cell 144. The grid of the thyratron 208 and the anode of the vacuum photo tube 144 are connected to a high resistor 210 of five megohms resistance, which in turn is connected to the adjustable wiper or slider of the variable resistor 207. This wiper or slider is so adjusted that the thyratron tube 208 approaches its firing point but does not reach it as long as the photoelectric tube 144 is illuminated.

Due to the relative positions of the grid and cathode connections of the thyratron tube 208, the said grid would be more positive than the said cathode in this circuit if the photoelectric cell 144 were not passing current. When the photoelectric tube 144 is illuminated, however, its relatively large output current flows through the high resistor 210, causing a voltage drop such that the control grid of the thyratron tube 208 is made more negative than its critical potential, thereby preventing the thyratron tube 208 from firing. Thus, the potential difference produced across the high resistor 210 by the photoelectric cell output current more than balances the normal positive bias established by the setting of the wiper or slider of the variable resistor 207.

When, however, the beam of light 102 from the fixed reflector 94 is reduced below the critical point in response to the turning of the mirror 70 in FIGURE 3, the flow of output current from the photoelectric cell 144 through the high resistor 210 is either decreased or stopped completely, whereupon the negative cancelling voltage decreases or disappears and the control grid of the thyratron tube 208 becomes slightly positive so that the tube 208 fires and thereby energizes the stepping motor 211. One such stepping motor 211 which has been found satisfactory is that sold under the trade name "Cyclonome" by Sigma Instruments, Inc., South Braintree, Mass., and which is designed to turn through 18 degrees of one revolution for each pulse the thyratron tube 208 conducts. The anode of the thyratron tube 208 is connected through the line 212 to one terminal of the stepping motor 211, the other terminal of which is connected to the line 213 running back to the frequency converter 203. Because the thyratron tube 208 can only conduct current from its cathode to its anode, it can pass only the positive cycles of the alternating current to the stepping motor 211 in intermittent impulses, the negative cycles being thereby suppressed in this end of the circuit.

When illumination of the photoelectric tube 144 is re-established, the beyond-critical negative potential again appears on the control grid of the thyratron tube 208 in the manner described above. As soon as the alternating current anode potential sweeps through zero, the thyratron tube 208 extinguishes and its negative control grid regains control. This action keeps the thyratron tube 208 non-conducting until the light is again interrupted or decreased.

As a consequence, therefore, the probing device 10 actually controls every impule going to this stepping motor 211 which, in turn, controls the travel of the probing device 10 itself, as well as controlling through a parallel-connected similar stepping motor 196 driving the worm 195 meshing with the worm wheel 193, so that the slave motion of the carriage of the automated drafting board or of a slave mill respectively will move in identical steps and cravel identical distances.

When the action of the stepping motor 211 has returned the probing device 10 is to correct mean position, the halves of the light beam 120 reflected from the opposite sides balance each other and illuminate the photoelectric tube 144 with the same intensity as the photoelectric tube 146.

An identical energization circuit is provided for the stepping motor 215 symmetrically opposite to the above-described energization circuit for the stepping motor 211, and includes a 1000 ohm fixed resistor 216 and a 5000 ohm variable resistor 217 connected in series with the other output line 213 of the frequency converter 203. The slider or wiper of the variable resistor 217 is connected to the five megohm resistor 218, the other end of which is connected to both the anode of the photoelectric tube 146 and to the first grid or control grid of the thyratron tube 219 similar to the thyratron tube 208. The second grid of the thyratron tube 219 is connected, as before, to its cathode which, in turn is connected to the circuit between the resistors 216 and 217. Heater current is connected, as before, by connection (not shown) to the heater outlet of the power supply 204. If, in place of the thyratron tubes 208 and 219, solid state thyratrons are used, such as those known commercially as General Electric No. S27, no heater supply current is needed.

The above-described circuit for the stepping motor 215 operates identically to the circuit for the stepping motor 211 as previously described, but the stepping motor 215 operates counterclockwise, through the same gearing. As a consequence, the slide or carriage carrying the probing device 10 is caused to move in the opposite direction from that caused by the stepping motor 211, but in identical analog steps per impulse. A fourth stepping motor, 197, wired in parallel to the stepping motor 215, drives the worm 195 and worm wheel nut 193 reversely so as to move the slide or carriage of the automated drafting board or slave mill in the opposite direction and in identical analog and synchronized steps per each impulse.

As long as the stepping motors 211 and 215 can return the probing device 10 to its mean position without the light beam 102 leaving the reflecting surface of the stationary reflector 94 in FIGURE 3, no other circuits are energized. When, however, the response is not fast enough and the light beam 102 is deflected further past the surfaces of the stationary reflection 94, it strikes either of the adjacent photoelectric cells 148 or 150, for which the photo-conductive cells, known commercially as General Electric No. 22F3002 have been found satisfactory. Both photoelectric cells are connected through lines 222 or 223 respectively to the direct current power supply 204. The other sides of the photoelectric cells 148 and 150 respectively are connected to the first inputs of "AND" logic modules designated 224, 225, 226 and 227 respectively. The second inputs of the "AND" logic modules 224 and 226 are connected respectively to the anodes of the thyratrons 208 and 219. When the logic modules 224 and 226 respectively receive impulses simultaneously from the photoelectric cells 148 and 150 respectively and from the anodes of the thyratrons 208 and 219 respectively, they emit an output signal.

When either such output signal arrives at an "OR" logic module designated 228, the latter emits an output signal. This output signal in turn causes a reduction of frequency of the feed motion for the probing device 10 and the automated drafting board or slave mill respectively in order to slow down all feed motions sufficiently for the sensing motion of the probing device 10 to catch up.

Each anode of the thyratron tubes 208 and 219 respectively is also connected to a "NOT" logic module designated 229 and 230 respectively. As long as the "NOT" module 229 or 230 respectively is energized through the anode of the thyratron tube 208 or 219 respectively, there will be no output from either of the "NOT" logic modules 229 or 230. However, when the light beam 102 is deflected sufficiently past the reflecting surfaces of the stationary reflector 94 in FIGURE 3, to illuminate directly either of the photo-electric cells 148 or 150, so that the opposite photoelectric cell 148 or 150 is dimmed too, and both thyratrons 208 and 219 are firing, all sensory motion is cancelled because neither photoelectric cell 148 or 150 is then holding its respective thyratron grid below the firing point thereof, neither "NOT" logic module 229 or 230 is energized and, therefore, each sends a signal to the "AND" logic module 225 or 227. This action permits the particular "AND" module which has also received the current from its energized photoelectric cell 148 or 150 respectively as its second input, to send out a signal which now is used by the "OR" logic module 231 to send out a signal, in order to stop the feed motion immediately, thereby preventing damage to the probing device 10 or to the model being probed. "AND," "OR" and "NOT" logic modules as made and sold by the Westinghouse Electric Company of Pittsburgh, Pa. under its trade name "CYPAK" and numbers 316C202G01, 316C207G01, and 316C205G01 respectively, have been found suitable for the above purposes.

There are also other devices needed to make operative the logic modules shown in FIGURE 5, but for the sake of clarity and simplicity, these have been omitted as they are well known to engineers versed in the art of arranging control functions through the use of logic modules or similar devices. Only one arrangement of such devices is shown in FIGURE 5, but it will be understood by those skilled in this art that there are several different ways to arrange other auxiliary photoelectric cells and control functions through logic modules, as may be required for specific probing functions. Since the light beam 102 can be displaced by more than 90° from its median axis, for example, there is room within the casing 16 for quite a number of additional light-sensitive devices. Logic modules and their uses, together with representative circuits, are described in the General Electric Transistor Manual, Fifth Edition, 1960, chapter 12, entitled "Logic," pages 125 through 135, published by the General Electric Company.

Another application of the above-described probing device 10, when sensing the contour of a model, is to continuously, automatically and instantaneously generate the digital coordinates or sections of said model suitable for input into a computer. Each current impulse has a designated positive and negative meaning, depending on whether the phototube 144 or 146 has caused its respective dependent thyratron 208 or 219 to fire. Through the above-mentioned relationship between the stepping motors and the transport of the bridge holding the probing device 10, and as 2000 impulses sent to either stepping motor 211 or 215 equals one inch of positive or negative travel on one coordinate, the present invention with a suitable network and by counting these impulses makes it possible to coordinate the feeding motion digitally with the sensing motion. Thus, if a counter is set up for counting the impulses of the feed motion and to trigger a digital printout, either on punched cards or on magnetic tape, the exact position of the traverse carriage from a zero point can be printed as one coordinate, activated as a feed motion at the required point, for instance every one eighth of an inch of travel or after a count of 250 pulses. At the same time, the accurate other coordinate can be printed concurrently with the exact position in space of the probe tip 58.

Another approach in using this probing device 10 for the same goal, because its actions are tied to meaningful incremental steps through cycles, is to attach a transducer to each worm drive to send a signal at 18° rotation to the computer, thereby always coordinating the two signals as coordinates.

At present, the manual printout, as input into a computer, of coordinates of section lines is not accurate, because the input of the same line when viewed in different views is not true to projected points. The digital output of the probing device 10, when used in different views, can be accurately and automatically correlated through interlocked, automatic counting systems, at the same time eliminating the human errors which are found in presently-used coordinatographs. This is described as to the method in my co-pending applications Ser. No. 380,603 filed July 6, 1964 for Method for Producing Machine-Tool-Controlling Magnetic Tapes from Drawings, and as to the apparatus in my co-pending application Ser. No. 340,983 filed Jan. 29, 1964 for Method and Apparatus for Producing Machine-Tool-Controlling Magnetic Tapes Directly from Drawings.

Another application of the above-described probing device 10, when sensing the contour of a model, is to automatically and continuously generate the tape needed to operate numerical controls for three-dimensional milling machines. In this case, the tip 58 of the probe 56 must be equipped with a round nose simulating the cutting tip of the cutter itself. This would then correctly sense the cutting or contact point in relation to the center line of the cutter.

A further modified contour probing device, generally designated 290, shown in FIGURES 6 to 9 inclusive is arranged to scan in a full circle so as to follow a 360° contour or outline in one such plane, such as, for example, a window opening in an automotive body, and to register that contour or outline on a drawing.

The modified probing device 290 is provided with photo cells 329 to 336 inclusive (FIGURE 7) and phototubes 301 to 304 inclusive (FIGURE 8) arranged in full circles around an axis coinciding with the incident portion of a light beam 292, as shown in FIGURE 6. The collimated light beam 292 from the light source 294 and collimator 317 is projected downward upon and reflected from a very slight conical reflecting mirror 299 in the neutral position, forming a circular pattern onto the circular reflecting prism 300, which again deflects the light equally to four or more photo-tubes 301 to 304 arranged in a full circle. Only half of the rays of the light beam are shown for the sake of clarity.

This construction consists of an annular middle housing 305, the upper end of which is closed by a cup-shaped top housing 315. The housing 305 is attached to the carriage of the machine through a stud-like projection or stem 306 around which the probe can be positioned. Attached to the annular middle housing 305 is a cylindrical bottom housing 307 which carries on ballbearings 308 in a socket, a ball 309, which is retained in the socket through a circular retainer 310. Extended below the ball 309 is a short scanning finger or probe 311 which carries a small contact tip ball 312. This ball tip 312, which may be fastened rotatably on said finger 311, contacts the workpiece opening to be scanned. Any variation of the contour of the workpiece opening being scanned causes a tilting of the scanning finger 311, which in turn produces an angular motion of the ball 309. In the center of this ball 309 is located a slightly conical reflecting mirror 299 which, in its central or neutral position, splits the light beam in a uniform ring and reflects the beam uniformly back upon the circular ring or prism 300. The ring prism 300 is mounted in a cup-shaped housing 315 and is retained in position by means of the flanged tube 316 of the beam projector or collimator 317 and by a retaining ring or open-centered plate 337 which in turn is secured by screws (not shown) to the internal annular shoulder 338 of the top housing 315.

The light beam, after having been reflected again through the circular prism 300, now strikes the four photo tubes 301, 302, 303 and 304 uniformly, causing them to emit current which holds eight thyratrons from firing, as will be explained later in connection with the wiring diagram thereof shown in FIGURE 10.

Any deflection of the probe tip 312 will cause a shift of light and, thereby, cause the output of one or more photo-tubes to drop below the point which controls the firing of the thyratrons, as shown in the wiring diagram of FIGURE 10. The output of the thyratron will return the probe to its neutral position. The neutral position of the ball 309 and the mirror 299 is established through a centering spring 319, exerting uniform pressure on the ball through its eight or more fingers 320.

The feeding motion of the probe towards the contour is initiated manually by manipulating a conventional "joy stick" master switch on the operator control console (see the previously-mentioned Fengler U.S. Patent 3,032,881 of May 8, 1962 for Contour-Reproducing Apparatus) until the probe makes contact with the object to be scanned. Such a "Joy Stick Master Switch" is manufactured and sold under that title by the General Electric Company of Schenectady, N.Y., under Catalog No. IC 3012–L on page 12 of its Bulletin 2270 issued July 22, 1963. The "joy stick master switch" energizes one of a set of magnets 321 through 328 which attracts a finger 320 of the spring 319 and thereby overrides the centering spring in the direction thus chosen by the operator so as to tilt the mirror 299 to the opposite side. This action initiates the firing of one or more thyratrons so as to cause the machine carriages to move accordingly. When the tip 312 of the probe 311 touches the contour being scanned, the probe 311 will continue to tilt around its ball pivot 309 until the light beam reaches its neutral or centered position, thereby inhibiting the thyratron from conducting. A slight shift of the joy stick master switch by the operator in the direction of the contour being scanned, will cause the probe 311 to follow the contour until it again reaches its neutral or centered position, and thereafter it continually slides along the contour under very low pressure until the probe 311 has reached its starting point on the contour.

Should the annular motion of the probe 311 around its ball pivot 309 be excessive at any time, the light beam 292 is deflected past the circular reflecting prism 300 and onto the photo-cells 329 to 336 inclusive, which are arranged in a circle around the reflecting prism 300, as shown in FIGURE 7. These photo cells are mounted on the same retaining ring or open-centered plate 337, which retains the circular reflecting prism 300 in position.

*Universally-movable contour probing device*

Another application of the modified contour probing device 290 of FIGURES 6 to 9 inclusive when sensing the contour of a model, is shown in FIGURE 10 and controls not only its own motion but simultaneously that of an automated drafting board or slave mill in both the X-axis and the Y-axis directions. The machine which holds and moves the contour probing device 290 and the automated drafting board has been disclosed and claimed in my above-mentioned United States Patent No. 3,032,881 issued May 8, 1962, and the slave mill in my co-pending patent application Ser. No. 340,983 filed Jan. 29, 1964.

The arrangement for controlling both the X-axis and the Y-axis shown in FIGURE 10 in its lower half entitled "X-axis control" has much of its circuitry and components the same as shown in the wiring diagram of FIGURE 5, and such same components and wiring have been designated with the same reference numerals to indicate the similarity. It will be observed, however, that other components have been added to this lower half of the diagram and other components somewhat altered, these being indicated by reference numerals designated in the 300 series.

The upper half of the wiring diagram of FIGURE 10, designated "Y-axis control" is completely new, although employing similar components and circuitry to the lower half or "X-axis control." Consequently, the reference numerals in the upper half of FIGURE 10 are designated in the 300, 400 and 500 series except for the plug 200 and wires 201 and 202 leading from the current source to the Y-axis control circuit, which are designated the same as those in the lower half. While the description of the lower half of FIGURE 10, designated "X-axis control," necessarily repeats much of the description of the circuit shown in FIGURE 5, it is deemed better for the sake of a clear understanding of FIGURE 10 to do so, rather than to require continually referring back to FIGURE 5 and its description, since the repeated portion of FIGURE 5 in the X-axis circuit portion in the lower half of FIGURE 10 operates in inseparable cooperation with the Y-axis control in the upper half thereof.

In the wiring diagram of FIGURE 10, as in that of FIGURE 5, the number 200 designated the input connection of the standard supply of 115 volts alternating current of 60 cycles per second frequency. Lines 201 and 202, respectively, furnish power to a variable frequency converter 203 for the X-axis control and to a variable frequency converter 403 for the Y-axis control. Lines 201 and 202 also furnish power to a filtered direct current and alternating current heater power supply 204 for the X-axis and also to a filtered direct current supply 404 for the Y-axis. Both DC power supplies 204 and 404 are so selected as to provide the proper voltage for the selected logic modules and tubes which are described later. The manual selection of the frequency used will control individually the speed of travel along the X-axis and also along the Y-axis in "true time." For instance, 60 cycles per second will move the carriages .030 inch per second in either or both directions, which equals a speed of 1.8 inches per minute, whereas 400 cycles per second will move the carriages 12 inches per minute.

The output of the frequency converter 203 is connected through line 205 to the fixed resistor 206 of 1000 ohms resistance. The other end of this resistor 206 is connected to the large variable resistor 207 of 5000 ohms resistance and also to the cathode of the thyratron tube 208 of the type commercially designated General Electric No. 2050–A. The second grid of this tube 208 is connected to its cathode. Heating voltage for this tube 208 is provided by connections (not shown) to the heater current supply output of the above-mentioned direct current power and alternating current supply 204 in FIGURE 10. These connecting lines are omitted for the sake of the clarity of this wiring diagram.

The light beam 292 in FIGURE 6, after reflection from the reflectors 299 and 300, strikes the photoelectric cell 301 which is of the type commercially designated Radio Corporation of America No. 1P42. The cathode of the photoelectric cell 301 is directly connected to the line 205 coming from the frequency converter 203, whereas its anode is connected to the first control grid of the thyratron tube 208.

The output of this thus-illuminated photoelectric cell tube 301 will so alter the voltage of the control grid of the thyratron tube 208 that it will not conduct as long as the light beam is fully resting on the cathode of the photoelectric cell 301. The grid of the thyratron 208 and the anode of the vacuum photo tube are connected to a high resistor 210 of five megohms resistance, which in turn is connected to the adjustable wiper or slider of the variable resistor 207. This wiper or slider is so adjusted that the thyratron tube 208 approaches its firing point but does not reach it as long as the photoelectric cell 301 is illuminated.

Due to the relative positions of the grid and cathode connections of the thyratron tube 208, the said grid would be more positive than the said cathode in this circuit if the photoelectric cell 301 were not passing current. When the photoelectric cell 301 is illuminated, however, its relatively large output current flows through the high resistor 210, causing a voltage drop such that the control grid of the thyratron tube 208 is made more negative than its critical potential, thereby preventing the thyratron tube 208 from firing. Thus, the potential difference produced across the high resistor 210 by the output current from the photoelectric cell 301 more than balances the normal positive bias established by the setting of the wiper or slider of the variable resistor 207.

When, however, the beam of light 292 from the fixed reflector 300 is reduced below the critical point in response to the turning of the mirror 299 in FIGURE 6, the flow of output current from the photoelectric cell 301 through the high resistor 210 is either decreased or stopped completely, whereupon the negative cancelling voltage decreases or disappears and the control grid of the thyratron tube 208 becomes slightly positive so that the tube 208 fires and thereby energizes the stepping motor 211. One such stepping motor 211 which has been found satisfactory is that sold under the trade name "Cyclonome" by Sigma Instruments, Inc., South Braintree, Mass., and which is designed to turn through 18 degrees of one revolution for each pulse the thyratron tube 208 conducts. The anode of the thyratron tube 208 is connected through the line 212 to one terminal of the stepping motor 211, the other terminal of which is connected to the line 213 running back to the frequency converter 203. Because the thyratron tube 208 can only conduct current from its cathode to its anode, it can pass only the positive cycles of the alternating current to the stepping motor 211 in intermittent impulses, the negative cycles being thereby suppressed in this end of the circuit.

When illumination of the photoelectric cell 301 is reestablished by the requisite tilting of the mirror 299, the beyond-critical negative potential again appears on the control grid of the thyratron tube 208 in the manner described above. As soon as the alternating current anode potential sweeps through zero, the thyratron tube 208 extinguishes and its negative control grid regains control. This action keeps the thyratron tube 208 non-conducting until the light beam from the tilting mirror 299 is again interrupted or decreased.

As a consequence, therefore, the probing device 290 actually controls every impulse going to the stepping motor 211 which, in turn, controls the travel of the probing device 290 itself, as well as controlling through a parallel-connected similar stepping motor 196 the slave motion of the carriage of the above-mentioned automated drafting board or the above-mentioned slave mill respectively in identical steps and traveling identical distances. When the action of the stepping motor 211 has returned the probing device 290 to its correct mean or neutral position, the halves of the light beam 292 reflected from the opposite sides of the tilting mirror 299 balance each other and illuminate the photoelectric tube 303 with the same intensity as the photoelectric tube 301.

An identical energization circuit is provided in FIGURE 10 for the stepping motor 215 symmetrically opposite to the above-described energization circuit for the stepping motor 211, and includes the 1000 ohm fixed resistor 216 and the 5000 ohm variable resistor 217 connected in series with the other output line 213 of the frequency converter 203. The slider or wiper of the variable resistor 217 is connected to the five megohm resistor 218, the other end of which is connected to both the anode of the photoelectric cell 303 and to the first grid or control grid of the thyratron tube 219, which is similar to the thyratron tube 208. The second grid of the thyratron tube 219, like that of the thyratron tube 208, is connected to its cathode which, in turn, is connected to the circuit between the resistors 216 and 217. Heater current is provided, as before, by connections (not shown) to the heater current supply outlet of the power supply 204. If, in place of the thyratron tubes 208 and 219, solid state thyratrons are used, such as those known commercially as General Electric No. S27, no heater supply current is needed.

The above-described circuit for the stepping motor 215 operates identically to the circuit for the stepping motor 211 as previously described, but the stepping motor 215 operates counterclockwise, through the same gearing. As a consequence, the slide or carriage carrying the probing device 290 is caused to move in the opposite direction along the X-axis from that caused by the stepping motor 211, but in identical analog steps per impulse. A fourth stepping motor 197 wired in parallel to the stepping motor 215 moves the slide or carriage of the automated drafting board or slave mill along its X-axis in the opposite direction and also in identical analog and synchronized steps per impulse.

As long as the stepping motors 211 and 215 can return the probing device 290 to its mean position without the light beam 292 leaving the reflecting surface of the stationary reflector 300 in FIGURE 6 no other circuits in FIGURE 10 of the X-axis are energized.

The energization circuits for the Y-axis are identical, and are exactly duplicated for the stepping motor 411, and include their own variable frequency converter 403 and DC power supply 404 with 6.3 volts AC heater supply output, as before with the current supply 204. The output of the frequency converter 403 is connected through the line 405 to a fixed resistor 406 of 1000 ohms resistance, and 5000 ohm variable resistor 407 connected in series with the other output line of the frequency converter 403 through the line 413. The slider or wiper of the variable resistor 407 is connected to the five megohm resistor 410, the other end of which is connected to both the anode of the photoelectric cell 302 and to the first grid or control grid of the thyratron tube 408. The second grid of the thyratron tube 408 is connected, as before, to its cathode which, in turn, is connected to the circuit between the resistors 406 and 407. Heater current is connected, as before, by connections (not shown) to the heater outlet of the power supply 404. The above-described circuit for the stepping motor 411 of the Y-axis is operated identically to the circuit for the stepping motor 211 for the X-axis, as previously described, but again the stepping motor 415 operates counterclockwise through the same gearing as the stepping motor 411 which operates clockwise. As a consequence, the slide or carriage carrying the probing device 290 is caused by the stepping motor 415 to move in the opposite direction on the Y-axis from its motion caused by the stepping motor 411. The stepping motors 496 and 497, shown in the diagram FIGURE 10, are used in parallel to move the scriber of the drafting board along its Y-axis as previously mentioned, and shown in detail in my said U.S. Patent No. 3,032,881 of May 8, 1962.

The circuit energizing the stepping motor 415 is again identical with and duplicates the circuit for the stepping motor 411, and its components are as follows: Across the lines 405 and 413, a 1000 ohm resistor 416 and a 5000 ohm variable resistor 417 are connected in series. The slide of this variable resistor 417 is connected to a 5- megohm resistor 418, the other end of which is connected to both the anode of the photoelectric cell 304 and to the control grid of the thyratron tube 419. The second grid of the thyratron tube 419 is connected, as before, to its cathode which, in turn, is connected to the circuit between the resistors 416 and 417. Heater current is connected, as before, by connection (not shown) to the heater outlet on the power supply 404. The above-described circuit for the stepping motor 415 of the Y-axis operated identically to the circuit for the stepping motor 215 for the X-axis, and both operate in a counterclockwise manner. The stepping motor 411 turns, through the worm 494, the worm gear 492, which moves the carriage that holds the probe 290 along the Y-axis in a positive direction, and the stepping motor 415 reverses this movement. Stepping motors 496 and 497 move the carriage which holds the scriber in step or clockwise, and in positive and negative directions or counterclockwise respectively.

When the response of the respective stepping motor is not fast enough and the light beam 292 is deflected further past the surfaces of the stationary reflector 300, it strikes one of the eight adjacent photoelectric cells numbered from 329 to 336 in FIGURE 7, for which the photoconductive cells, known commercially as General Electric No. 22F 3002, have been found satisfactory. All photoelectric cells are connected through lines 222 and 223, or 422 and 423 respectively, to the two direct current power supplies 204 or 404. The other sides of the photoelectric cells 329 and 333 respectively, as an example, are connected to the first inputs of "AND" logic modules, designated 224, 225, 226 and 227 respectively. The second inputs of the "AND" logic modules 224 and 226 are connected respectively to the anodes of the thyratrons 208 and 219. When the logic modules 224 and 226 receive impulses simultaneously from the photoelectric cells 329 and 333 respectively, and from the anodes of the thyratrons 208 and 219, they emit an output signal.

When either such signal arrives at an "OR" logic module designated 228, the latter emits an output signal. This output signal, in turn, causes a reduction of frequency of the Y-axis motion for the probing device 290 and the automated drafting board or slave mill respectively, in order to slow down this feed motion sufficiently for the sensing motion of the probing device 290 along its X-axis to catch up.

Each anode of the thyratron tubes 208 and 219 is also connected to a "NOT" logic module designated 229 and 230 respectively. As long as the "NOT" module 229 or 230 is energized through the anode of the thyratron tube 208 and 219, respectively, there will be no output from either of the "NOT" logic modules 229 or 230. However, when the light beam 292 is deflected sufficiently past the reflecting surfaces of the stationary reflector 300 in FIGURE 6, so that the opposite photoelectric cell 301 or 303 is dimmed too, and both thyratrons 208 and 219 are firing, all sensory motion along the X-axis is cancelled, because neither photoelectric cell 301 or 303 is then holding its respective thyratron grid below the firing point thereof, neither "NOT" logic module 229 or 230 is energized, and therefore, each sends a signal to the "AND" logic module 225 or 227. This action permits the particular "AND" logic module which has also received the current from its energized photoelectric cell 301 or 303 respectively, as its second input, to send out a signal which now is used by the "OR" logic module 231 to send out a signal, in order to stop the feed motion immediately, thereby preventing any damage to the probing device 290 or to the model being probed. I have only described the circuit of the photoelectric cells along the X-axis. The photoelectric cells 331 and 335 operate along the Y-axis, and the other photoelectric cells 330, 332, 334 and 336 operate angularly in between the X and Y axes, and through their respective logic modules 524, 525, 526 and 527 guard the cross-over between the axes. "AND," "OR" and "NOT" logic modules, as made and sold by the Westinghouse Electric Company of Pittsburgh, Pennsylvania, under its trade name "Cypak" and numbers 316C202G01, 316C207G01 and 316C205G01 respectively have been found suitable for the above purposes.

Certain other devices needed to make operative the logic modules shown in FIGURE 10 have been omitted for the sake of clarity and simplicity, as they are well known to engineers versed in the art of arranging control functions through the use of logic modules or similar devices. Only one arrangement of such devices is shown in FIGURE 10, but it will be understood by those skilled in this art that there are several different ways to arrange other auxiliary photoelectric cells and control functions through logic modules, as may be required for specific probing functions. Since, for example, the light beam 292 can be displaced from its median axis through a greater angle than that shown, there is room within the casing 305 for quite a number of additional light-sensitive devices. Logic modules and their uses together with representative circuits, are described in the General Electric Transistor Manual, Fifth Edition 1960, chapter 12, entitled "Logic," pages 125 through 135, published by the General Electric Company, Schenectady, New York.

Thus, the wiring diagram of FIGURE 10 consists, as we have shown above, of four complete circuits, namely controlling a positive and a negative movement through the worm 194 on the worm gear 192 so as to turn the screw shaft 190 to move the carriage of the probing device 290 along the X-axis and parallel through the worm 195 on the worm gear 193 so as to turn the screw shaft 191 to move the scriber of the automated drafting board disclosed and claimed in my previously-mentioned U.S. Patent No. 3,032,881 of May 8, 1962 along the X-axis; and also controlling a positive and a negative movement through the worm 494 on the worm gear 492 so as to turn the screw shaft 490 to move the carriage of the probing device 290 along the Y-axis and parallel through the worm 495 on the worm gear 493 so as to turn the screw shaft 490 to move the scriber of the automated drafting board (not shown) disclosed and claimed in my previously-mentioned U.S. Patent No. 3,032,881 along the Y-axis.

The operation of the logic modules interconnecting the four circuits just mentioned above and guarding the operation of the device 290 against overloads not recognized by the operator in time for him to take corrective actions will now be summarized. As described above, the photoelectric cells 329 and 333 in FIGURE 7 guard against the excessive travel of the light beam 292 past the stationary reflector 300, when the travel of the carriage is approximately along the X-axis. The photoelectric cells 331 and 335 guard against excessive travel of the light beam 292 past the stationary reflector 300, when the travel of the carriage is approximately along the Y-axis. The photoelectric cell 330 guards against excessive travel of the light beam 292 when the travel of the carriage is positive along the X-axis, while also positive concurrently along the Y-axis. The photoelectric cell 334 guards against excessive travel of the light beam 292 when the travel of the carriage is negative along the X-axis while also negative concurrently along the Y-axis. The photoelectric cell 332 guards against excessive travel of the light beam 292 when the travel of the carriage is negative along the X-axis while also traveling concurrently in a positive direction along the Y-axis. The photocell 336 guards against excessive travel of the light beam 292 when the travel of the carriage is positive along the X-axis while also negative concurrently along the Y-axis. Of course, these designations depend on how the probe 290 is actually mounted on the carriage in respect to the X and Y axes of the apparatus.

The outputs of the photoelectric cells 331 and 335 are connected to the first inputs of the "AND" logic modules 424, 425, 426 and 427. The second inputs of the "AND"

logic modules 424 and 426 are connected to the anodes of the thyratrons 408 and 419. When the logic modules 424 and 426 receive impulses simultaneously from the photoelectric cells 331 and 335 respectively, and from the thyratrons 408 and 419 respectively, they emit an output signal. When either such output signal arrives at an "OR" logic module 428, the latter emits an output signal. This output signal, in turn, causes a reduction in frequency of the X motion for the probing device 290 and the above-mentioned automated drafting board or slave mill in order to slow down this feed motion sufficiently for the sensing motion of the probing device 290 along its Y axis to catch up.

Each anode of the thyratron tubes 408 and 419 is also connected to a "NOT" logic module 429 or 430 respectively. As long as the "NOT" module 429 or 430 is energized through the anode of the thyratron tube 408 or 419, there will be no output from either of the "NOT" logic modules 429 or 430. However, when the light beam 292 is deflected sufficiently past the reflecting surfaces of the stationary reflector 300 (FIGURE 6) so that the opposite photoelectric cell 311 or 335 is dimmed too, and both thyratrons 408 and 419 are firing, all sensory motion along the Y-axis is cancelled. The "OR" logic module 231 sends out a signal to stop again the feed motion immediately.

What I claim is:

1. An ultra-sensitive photoelectric probing device for indicating quantitatively any departures from a predetermined configuration of the actual configuration of a three-dimensional surface of a probed object, said device comprising
    a supporting structure,
    a work-contacting contour probe movably mounted on said supporting structure,
    a movable reflector support tiltably mounted on said supporting structure,
    a movable reflector mounted on said support for tilting motion unitarily therewith in opposite directions from a predetermined zero position thereof,
    motion-transmitting mechanism operatively connecting said probe to said support for tilting said support in response to motion of said probe,
    a stationary beam divider mounted on said supporting structure remote from said movable reflector and in optical alignment therewith,
    a pair of photo-electric control cells disposed in spaced relationship to one another on opposite sides of said beam divider and in optical alignment therewith,
    and an illuminated collimator mounted on said supporting structure in optical alignment with said stationary reflector and positioned to project an equally divided beam of radiant energy onto said photoelectric cells by way of said movable reflector and stationary beam divider in said zero position of said movable reflector.

2. A probing device, according to claim 1, wherein said beam divider includes a pair of reflecting surfaces disposed at an angle to one another.

3. A probing device, according to claim 2, wherein said surfaces are disposed substantially perpendicular to one another.

4. A probing device, according to claim 2, wherein said beam divider comprises a prism having its apex aligned with the principal ray from said collimator and having its faces on opposite sides of said apex provided with said reflecting surfaces.

5. A probing device, according to claim 4, wherein said photoelectric control cells are disposed approximately in line with one another on opposite sides of said prism.

6. A probing device, according to claim 2, wherein said supporting structure includes a casing with top and side walls and a front wall and wherein said photoelectric control cells are mounted on opposite side walls.

7. A probing device, according to claim 1, wherein an additional pair of photoelectric limit cells are also disposed on opposite sides of said beam divider in the spaces between said beam divider and said photoelectric control cells, and positioned to receive radiant energy directly from said movable reflector in excessively tilted positions thereof.

8. A probing device, according to claim 7, wherein said supporting structure includes a casing with top and side walls and therein said photoelectric control cells are mounted on opposite side walls and said photoelectric limit cells are mounted on said top wall.

9. A probing device, according to claim 1, wherein said supporting structure includes a mounting member having a machine attachment portion and wherein said supporting structure is tiltably connected to said mounting member for angular adjustment relatively thereto.

10. A probing device, according to claim 9, wherein means is provided for releasably locking said supporting structure to said mounting member in the angularly-adjusted relative positions thereof.

11. A probing device, according to claim 1, wherein said probe is reciprocably mounted in said supporting structure and wherein said motion-transmitting mechanism converts reciprocating motion of said probe into rotary motion of said reflector support.

12. A probing device, according to claim 1, wherein said probe is swingably mounted in said supporting structure, and wherein said motion-transmitting mechanism converts swinging motion of said probe into rotary motion of said reflector support.

13. A probing device, according to claim 1, wherein there are additionally provided: a master carrier and a slave carrier movably mounted on said supporting structure, said movable reflector support being mounted on said master carrier for travel unitarily therewith; electromotive devices drivingly connected to said carriers for moving said carriers relatively to said supporting structure; and an electric circuit connecting said photoelectric cells to said electromotive devices and including means responsive to the tilting of said reflector support and the consequent variation in the proportionate distribution of luminous energy falling upon said photoelectric cells by way of said reflectors for correspondingly varying the speeds of motion of said carriers in proportion to the difference in the luminous energy falling upon said photoelectric cells.

14. A probing device, according to claim 13, wherein each carrier includes a screw element and a nut element threaded thereon and wherein one of said elements is held against rotation and the other element is rotatable thereon and drivingly connected to one of said electromotive devices for rotation thereby.

15. A probing device, according to claim 13, wherein said electromotive devices are reversingly connected to their respective carriers to impart motion thereto selectively in opposite directions.

16. A probing device, according to claim 13, wherein there is also provided means for continuously and instantaneously generating and transmitting electrical impulses representing the digital coordinates of successive positions of said carriers during the travel thereof effected by said electromotive devices.

17. A probing device, according to claim 1, wherein said movable reflector support is mounted for universal tilting, wherein said movable reflector has a conical reflecting surface, wherein said stationary beam divider has an annular reflecting surface thereon encircling the optical axis of said collimator, and wherein an additional pair of photoelectric control cells are disposed in diametrically-oppositely-spaced relationship to one another on opposite sides of said optical axis in circumferentially-spaced relationship of ninety degrees away from said previously-mentioned pair of photoelectric control cells.

18. A probing device, according to claim 17, wherein two additional pairs of photoelectric control cells are also disposed in diametrically-oppositely-spaced relationship to one another on opposite sides of said optical axis in circumferentially-spaced relationship intermediate said previously-mentioned pairs of photoelectric control cells.

19. A probing device, according to claim 18, wherein a multiplicity of electromagnets are arranged in circumferentially-spaced relationship adjacent said movable reflector support, and wherein an annular array of circumferentially-spaced photoelectric cells is mounted outwardly of said annular reflecting surface in selective magnetization-controlling relationship with said electromagnets in response to excessive tilting of said movable reflector beyond said annular reflecting surface.

20. A probing device, according to claim 17, wherein there are additionally provided: a master carrier and a slave carrier movably mounted on said supporting structure for travel in directions at right angles to one another along the X and Y coordinate axes respectively, said movable reflector support being mounted on said master carrier for travel unitarily therewith, electromotive devices connected to said carriers for moving said carriers in directions at right angles to one another along said X and Y axes relatively to said supporting structure, and an electric circuit connecting said photoelectric cells to said electromotive devices including X-axis and Y-axes control subcircuits controlling motion of said carriers along said X and Y axes respectively, said circuit including means responsive to the tilting of said reflector support and the consequent variation in the proportionate distribution of luminous energy falling upon said photoelectric cells by way of said reflectors for correspondingly varying the speeds and directions of motion along said X and Y axes in proportion to the difference in the luminous energy falling upon said photoelectric cells.

21. A probing device, according to claim 20, wherein said electromotive devices are reversingly connected to their respective carriers to impart motion thereto selectively in opposite directions along said X and Y axes.

22. A probing device, according to claim 20, wherein each carrier includes a screw element and a nut element threaded thereon and wherein one of said elements is held against rotation and the other element is rotatable thereon and drivingly connected to one of said electromotive devices for rotation thereby.

References Cited
UNITED STATES PATENTS

| | | | |
|---|---|---|---|
| 3,068,363 | 12/1962 | Samborski | 250—215 X |
| 3,124,692 | 3/1964 | Brouwer | 250—215 X |
| 3,138,714 | 6/1964 | Heidenhain | 250—215 X |
| 3,181,401 | 5/1965 | Rice et al. | 250—215 X |
| 3,184,600 | 5/1965 | Potter | 250—215 X |

JAMES W. LAWRENCE, *Primary Examiner.*

C. R. CAMPBELL, *Assistant Examiner.*